Sept. 8, 1925.  
R. W. ERICKSON ET AL  
1,552,476  
SAFETY WELDING TONGS  
Filed Aug. 9, 1924  
2 Sheets-Sheet 1
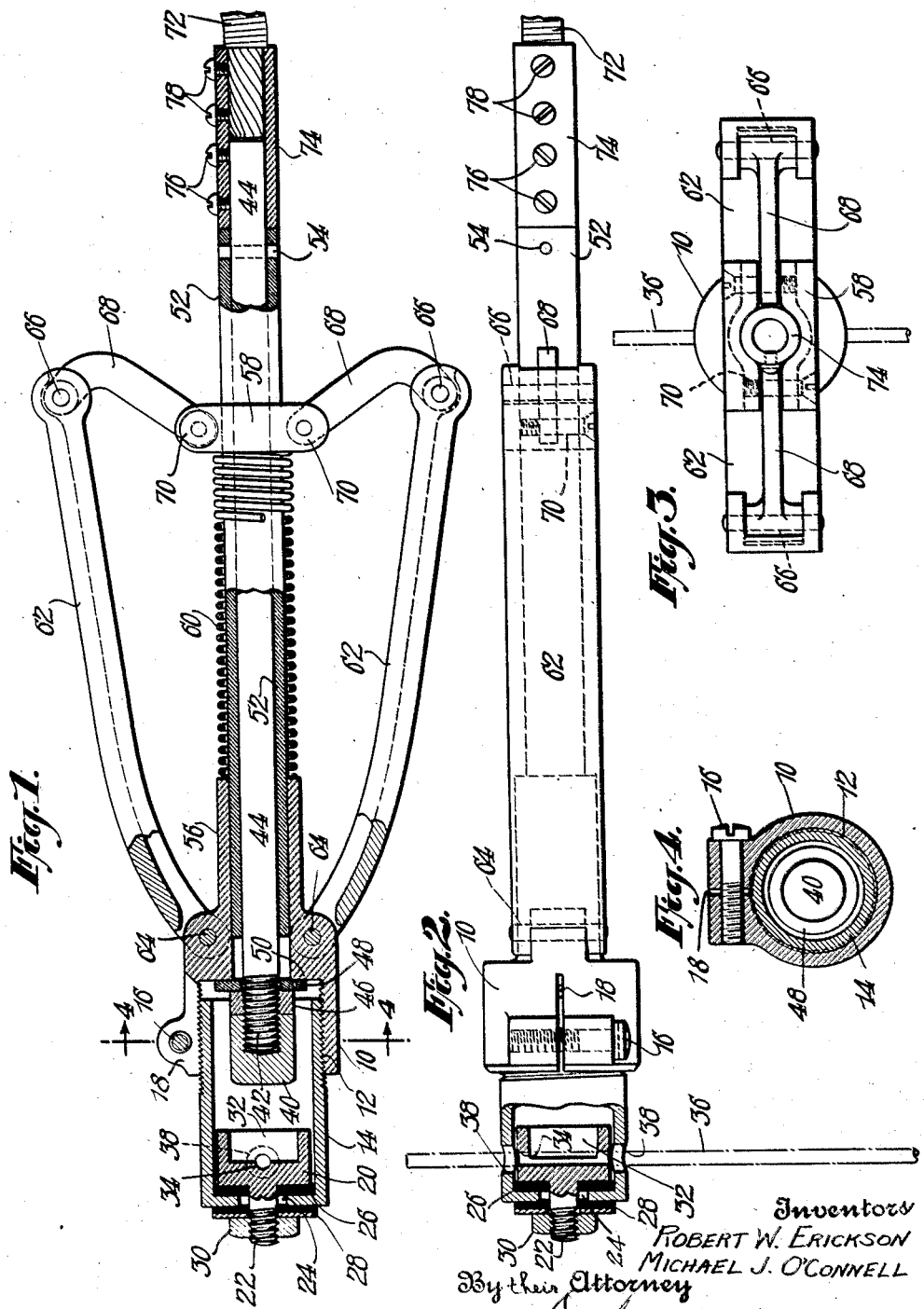
Inventors  
ROBERT W. ERICKSON  
MICHAEL J. O'CONNELL  
By their Attorney  
L. Anthony Usina Sept. 8, 1925.
R. W. ERICKSON ET AL
1,552,476
SAFETY WELDING TONGS
Filed Aug. 9, 1924
2 Sheets-Sheet 2
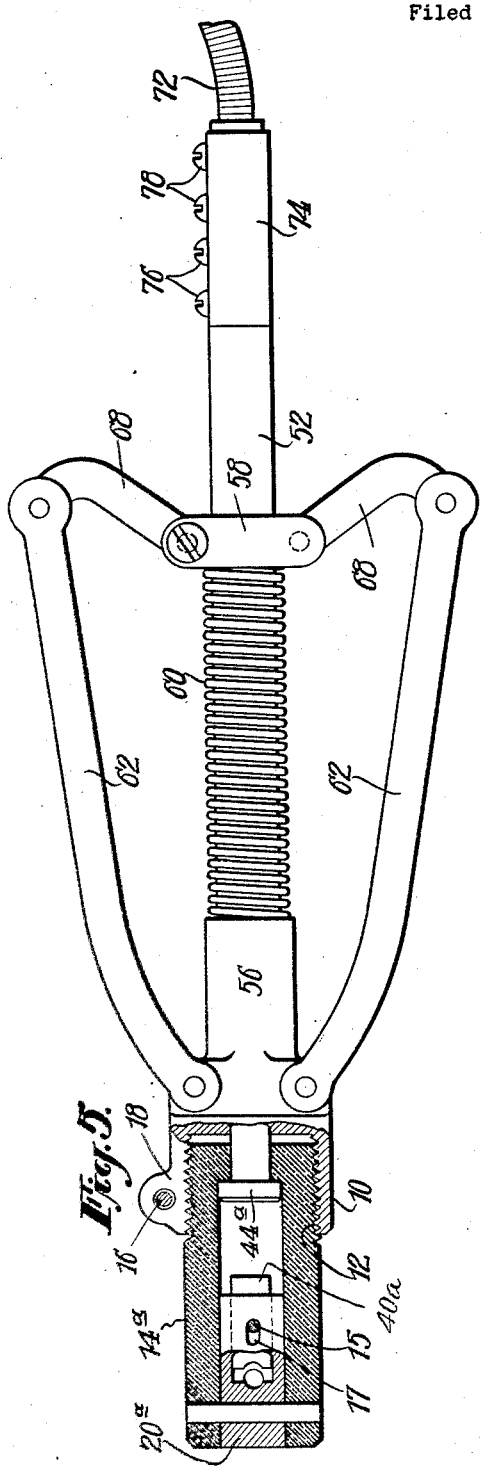
Inventors
ROBERT W. ERICKSON
MICHAEL J. O'CONNELL
By their Attorney
D. Anthony Usina Patented Sept. 8, 1925.

1,552,476

UNITED STATES PATENT OFFICE.

ROBERT WM. ERICKSON, OF JERSEY CITY, NEW JERSEY, AND MICHAEL J. O'CONNELL, OF BROOKLYN, NEW YORK.

SAFETY WELDING TONGS.

Application filed August 9, 1924. Serial No. 731,200.

*To all whom it may concern:*

Be it known that we, ROBERT W. ERICKSON and MICHAEL J. O'CONNELL, citizens of the United States, and residents of Jersey City, New Jersey, and Brooklyn, New York, respectively, have invented certain new and useful Improvements in Safety Welding Tongs, of which the following is a specification.

The invention relates to improvements in a tool for holding an electrode or wire pencil such as is used in arc welding.

In this type of welding an electric current is used to cause the required heating which in practice is effected by drawing an arc between the work to be welded and the electrode. To do this it is necessary to connect a wire carrying the current to the object to be welded and another wire of opposite electrical polarity to the electrode, which completes the circuit when the electrode makes contact with the work to be welded.

Under such conditions, the electrode and the un-insulated parts of its holder must be carefully handled, particularly so when laying it aside for purpose of inspecting the work, and so forth. Also when so laid aside it must be insulated from the object which is being welded, otherwise a short circuit will be formed. This is very often troublesome to accomplish, for instance, when welding on large objects such as steel ships, locomotives, and so forth and on objects in electrical contact with the earth.

The most common method of insulating the usual form of holder when so laid aside consists of laying it on a wood board or hanging it over a wood scaffold or the like. As potentials up to 500 volts are often used it can be readily seen that the live electrode when so laid aside constitutes a hazard to the operator and other workmen in the vicinity who may accidentally come into contact with it.

Our improved type of welding tongs overcomes this hazard as the current is automatically cut off from the electrode and exposed live parts when the operator releases the hand grip, and it may therefore be laid aside without insulating it from the work.

This is a great advantage from a standpoint of safety, and also results in greater efficiency since the operator and workmen in vicinity are thus able to devote their undivided attention to the work in hand.

These and other advantages will be apparent from the following specification when read in connection with the accompanying drawings in which—

Fig. 1 is a longitudinal section illustrating one embodiment of the invention;

Fig. 2 is a horizontal top plan;

Fig. 3 is an end view from the right of Fig. 2;

Fig. 4 is a detail section on line 4—4 of Fig. 1;

Fig. 5 is a view of a modified construction;

Fig. 6 is a side view showing an alternative structure.

Referring to the drawings, the main body 10 of the tool is screw threaded at 12 for adjustably securing thereto an extension tip 14 which can be locked in its adjusted position by tightening the screw 16 which passes through two upstanding lugs on opposite sides of a longitudinal kerf 18 formed in the end of the body 10.

In the end of the tip 14 is a fixed jaw 20 which is provided with a threaded shank 22 passing through a clearance hole 24 in the end of the tip. Insulating washers 26 and 28 are provided on opposite sides of the end wall of the tip so as to prevent the passage of current from the jaw to the tip and main body, and a nut 30 serves to removably secure the jaw to the tip so that it can be replaced when badly worn or burnt. The jaw 20 is formed with a central longitudinal cavity 32 and a transverse aperture 34 through which the welding electrode or wire pencil 36 passes. The tip 14 is provided with apertures 38 of greater diameter than the electrodes so that current therefrom will not pass to the tip.

The movable jaw of the tongs comprises a renewable contact tip 40 which is threaded on the end 42 of a longitudinally extending shank 44, a jamb nut 46 being provided to adjustably secure the contact tip or jaw to said shank. An insulating washer 48 encircles the shank 44 and engages a shoulder 50 formed in the main body of the tongs which serves as a back stop for the movable jaw.

The shank 44 of the movable jaw is surrounded for the greater part of its length by an insulating sleeve 52 which is secured thereto by a pin or rivet 54. This sleeve slides freely in a rearward hub extension or guide 56 formed in the main body 10.

Located to the rear of the hub 56 and secured to the sleeve is a split collar 58 and between the latter and the hub is a compression spring 60 which tends to normally hold the movable jaw 40 away from the fixed jaw 20 or in substantially the position shown in Fig. 1.

For moving the jaw 40 forward to forcibly clamp the electrode 36 to the fixed jaw 20, hand grips 62 are provided which are pivoted at 64 to lugs on the main body 10 and at 66 to toggle links 68 which are in turn pivoted to the collar 58 carried by the above mentioned sleeve 52.

To the rear end of the shank 44 a flexible conductor 72 is connected by means of a metal sleeve 74 and suitable binding screws 76 and 78 as shown.

In Fig. 6 we have shown a slight modification wherein the movable jaw is actuated by a single toggle and hand grip; in this form the body is formed with a guide extension 80 on which the collar 58 slides and the outer surface 82 serves as a fixed hand grip.

Fig. 6 shows an alternative construction in which the tip 14ª is formed of insulation screwed into the body 10, and has riveted thereto a fixed jaw 20ª which is chambered to slidingly support a moving jaw 40ª whose movement is limited by a pin and slot connection 15—17. The jaw 40ª is forced forward by a headed shank 44ª which is actuated in the same manner as the shank 40 above described.

In operation a wire pencil or electrode 36 is inserted through the opening in the tip of the tongs and the hand grips are pressed together which action results in moving the jaw 40 into electrical contact with the electrode and also forcibly clamping the latter between the two jaws. The toggle action of the hand grips permits the exertion of a tremendous force inasmuch as the ratio of the pressure exerted on the hand grips to the pressure of the movable jaw on the electrode increases as the tangent of the angle included between a line passing through the pivots of the links 68 and a plane perpendicular to the axis of the shank 44.

When the operator completes welding a piece of work the circuit to the electrode is automatically broken by releasing the pressure on the hand grips and the tongs can be laid aside without danger of causing short circuits or injuring persons in its vicinity.

The design is such that the electrode is located sufficiently remote from the hand grips so that the heat due to contact resistance or heat of conduction will be dissipated before reaching the hand grips.

The parts which are subject to wear or burning can be readily replaced or can be adjusted to compensate for such wear.

Though we have described with great particularity specific embodiments of the invention illustrated, it is not to be construed that we are limited thereto as various modifications and substitutions of equivalents may be made without departing from the invention as defined in the appended claims.

What we claim is:

1. A welding tongs including coacting members arranged to jointly engage the welding electrode, means for forcing one of said members toward the other to exert a grip on the electrode, a spring tending to hold said members apart and insulating means between said members.

2. A welding tongs including coacting members adapted to jointly clamp and complete the welding circuit through a welding electrode, means for insulating said members from one another, a hand grip for forcing one of said members toward the other, and means for separating said members and breaking the welding circuit when said hand grip is released.

3. A welding tongs comprising a main body having a fixed jaw secured to but insulated therefrom, a movable jaw insulated from said body, means tending to normally hold said jaws apart and toggle mechanism for forcing the movable jaw toward the fixed jaw.

4. A welding tongs comprising a main body having a fixed jaw adjustably secured thereto, a movable jaw connected with an electric conductor, a hand grip for moving the latter toward the fixed jaw to exert a grip on the welding electrode, a spring tending to normally hold said jaws apart and means for insulating said movable jaw from both the hand grip and the main body.

5. A welding tongs comprising a main body having fixed and movable jaws between which a welding electrode is adapted to be clamped, means for supplying current to the movable jaw, manually operated means for moving the latter jaw and adjustable means for compensating for wear on said jaws.

6. A welding tongs comprising a main body, an adjustable member carried thereby, a jaw detachably secured in the latter, a movable jaw having an elongated shank carrying an insulating sleeve guided in said body, a hand grip pivoted at one end to said body, a toggle link secured to said sleeve and connected to said hand grip, a spring tending to hold said jaws apart and a conductor connected to said shank.

In testimony whereof, we have hereunto signed our names.

ROBERT WM. ERICKSON.
MICHAEL J. O'CONNELL